(12) United States Patent
Lee et al.

(10) Patent No.: US 12,528,410 B2
(45) Date of Patent: Jan. 20, 2026

(54) CLUTCH GEAR, ACTUATOR, REAR VIEW DEVICE AND VEHICLE

(71) Applicant: MOTHERSON INNOVATIONS COMPANY LIMITED, London (GB)

(72) Inventors: Youngmin Lee, Gyeonggi-do (KR); Heesung Woo, Gyeonggi-do (KR); Il-Sung Yu, Gyeonggi-do (KR); Chang Kyun Han, Chungcheongbuk-do (KR); Cheol Ho Yim, Gyeonggi-do (KR)

(73) Assignee: Motherson Innovations Company Limited, London (GB)

( * ) Notice: Subject to any disclaimer, the term of this patent is extended or adjusted under 35 U.S.C. 154(b) by 447 days.

(21) Appl. No.: 18/188,637

(22) Filed: Mar. 23, 2023

(65) Prior Publication Data
US 2023/0331157 A1  Oct. 19, 2023

(30) Foreign Application Priority Data

Apr. 13, 2022 (DE) .................. 10 2022 109 077.9

(51) Int. Cl.
*B60R 1/072* (2006.01)
*B60R 1/00* (2022.01)
*B60R 1/08* (2006.01)
*F16D 7/02* (2006.01)

(52) U.S. Cl.
CPC .............. *B60R 1/072* (2013.01); *B60R 1/08* (2013.01); *B60R 1/006* (2013.01); *F16D 7/022* (2013.01)

(58) Field of Classification Search
CPC ............ B60R 1/0612; B60R 1/07–072; B60R 1/006–007; F16D 41/20–206; F16D 7/02–022; F16D 1/0823
See application file for complete search history.

(56) References Cited

U.S. PATENT DOCUMENTS 5,170,676 A * 12/1992 Matouka ................. F16D 7/021
74/411
5,343,333 A * 8/1994 Nagayama ............... H01H 1/16
359/877

(Continued)

FOREIGN PATENT DOCUMENTS

CN      201068128     6/2008
CN      203637690     6/2014

(Continued)

OTHER PUBLICATIONS

German Patent Office, Appl. 10 2022 109 077.9, Office Action, Sep. 30, 2022.

*Primary Examiner* — James J Taylor, II
(74) *Attorney, Agent, or Firm* — Jones Day

(57) ABSTRACT

According to various embodiments of the present disclosure, a clutch gear is provided, that is adapted for use in an actuator of a rear view device, comprising a connection gear having a hole in its center and receiving power, and a body part inserted in the hole, characterized in that the body part comprises a first shaft part, a second shaft part, a receiving part between the first and second shaft parts, a pinion gear, and a clutch spring, wherein the clutch spring has an inner surface contacting the second shaft part, and an outer surface contacting the connection gear. Furthermore, an actuator and a rear view device as well as a vehicle is provided.

35 Claims, 11 Drawing Sheets

(56) References Cited

U.S. PATENT DOCUMENTS

| | | | |
|---|---|---|---|
| 7,090,363 B1 * | 8/2006 | Boddy | B60R 1/072 |
| | | | 359/872 |
| 10,017,119 B2 * | 7/2018 | Chong | B60R 1/072 |
| 2005/0099710 A1 | 5/2005 | Ro | |
| 2012/0275044 A1 * | 11/2012 | Caballero Tapia | B60R 1/072 |
| | | | 359/872 |
| 2016/0265635 A1 | 9/2016 | Chong | |

FOREIGN PATENT DOCUMENTS

| | | | | |
|---|---|---|---|---|
| CN | 205034028 U | * | 2/2016 | |
| CN | 205256180 | | 5/2016 | |
| CN | 110126739 | | 8/2019 | |
| DE | 10110034 A1 | * | 9/2002 | F16D 7/022 |
| EP | 2085564 A2 | * | 8/2009 | F16D 7/022 |
| WO | WO-9748915 A1 | * | 12/1997 | F16D 7/021 |

* cited by examiner

CLUTCH GEAR, ACTUATOR, REAR VIEW DEVICE AND VEHICLE

CROSS-REFERENCE TO RELATED APPLICATION

This application claims priority to German Application No. DE 10 2022 109 077.9, filed on Apr. 13, 2022, the entirety of which is incorporated herein by reference.

FIELD

The present disclosure relates to a clutch gear adapted for use in an actuator of a rear view device for a vehicle, comprising a connection gear having a hole in its center and receiving power, and a body part inserted in the hole. Furthermore, the present disclosure relates to an actuator comprising such a clutch gear and a rear view device of a vehicle comprising such a clutch gear or actuator.

BACKGROUND

A rear view device, such as an external mirror, of a vehicle may provide the driver with a lateral or rear view. In specific driving situation, for example a situation such as parking, a driver needs to have a view not only in the lateral or rear direction of the vehicle but also in the downward direction of the vehicle. In addition, it is necessary to provide various viewing angles depending on the driver's or driving situation.

In order to provide a view in various directions, a rear view element attached to the rear view device such as an external mirror or the rear view element as such may be pivoted. The rear view device may comprise an actuator that operates to pivot the rear view device and/or the rear view element, such as a mirror element, a display unit or a camera device.

U.S. Pat. No. 10,076,999 B2 discloses a movement mechanism comprising a substantially spherical holder and a substantially bowl-shaped ring, which, when inserted into each other, are rotatable relative to each other about a first axis, which lies in a plane which is substantially parallel with the top face of the holder, and a second axis, which second axis lies in a plane equal or parallel to the top face of the ring, and which second axis lies at an angle of approximately 90° to the first axis, while driving means are provided for enabling movement of the holder relative to the ring, which driving means comprise a first non-straight driving rod bearing-mounted in the holder, as well as means for activating the first non-straight driving rod, and a second non-straight driving rod bearing-mounted in the holder, as well as means for activating the second non-straight driving rod. Furthermore, the first non-straight driving rod and the second non-straight driving rod are rotatable about a third and a fourth axis, respectively, which third and fourth axes are mutually parallel and lie in a plane equal or parallel to the top face of the holder and wherein the third and fourth axes coincide with the first axis.

U.S. Pat. No. 6,929,374 B2 discloses a movement mechanism, comprising a substantially spherical holder and a substantially bowl-shaped ring, which, when inserted into each other, are rotatable relative to each other about at least one first axis, which lies in a plane which is substantially parallel with the top face of the holder, while driving means are provided for enabling movement of the holder relative to the ring, which driving means comprise a non-straight driving rod bearing-mounted in the holder, as well as means for activating the driving rod, characterized in that the driving rod has the shape of a ring segment and is connected with a driving part, which is rotatably mounted in a recess in the ring relative to a second axis, which second axis lies in a plane equal or parallel to the top face of the ring, and which second axis lies at an angle of approximately 90[deg.] to the first axis, wherein the ring segment is rotatable about a third axis which lies in a plane equal or parallel to the top face of the holder and which lies at an angle of approximately 45[deg.] to the first axis.

The driving mechanism for driving the actuator may comprise a driving motor and a gear structure operated by receiving power from the driving motor. In particular, the actuator can comprise a clutch gear to shift the output of the driving motor to reduce damage to the drive gear. The clutch gear needs to have excellent shifting effects and needs durability to endure repeated pivoting movements.

In view of the aforementioned drawbacks and other inherent in the existing state of the art, it is an object of the present disclosure to further develop the known clutch gear to overcome at least some of these drawbacks. In particular it is an object to provide a clutch gear having excellent transmission efficiency and improved durability even in repeated pivoting operations.

SUMMARY

A clutch gear according to embodiments of the present disclosure is adapted for use in an actuator of a rear view device for a vehicle, which comprises a connection gear having a hole in its center and receiving power, and a body part inserted in the hole, wherein the body part comprises a first shaft part, a second shaft part, a receiving part between the first and second shaft parts, a pinion gear, and a clutch spring, wherein the clutch spring may have an inner surface contacting the second shaft part, and an outer surface contacting the connection gear. In an embodiment, the receiving part may be adapted for partitioning the first and second shaft parts.

In an embodiment, the first shaft part may be formed in a first direction; the second shaft part may be formed in a second direction, wherein preferably the second direction is opposite to the first direction; an auxiliary region may be formed at an end of the second shaft part, preferably connected to a memory module; the receiving part may be adapted for partitioning the first and second shaft parts, preferably for engaging with at least a part of the connection gear; the body part may form a central axis of the clutch gear; the pinion gear may be arranged in at least a part of the first shaft part, wherein preferably the pinion gear may be engaged with an external gear; the pinion gear may be adjacent to the receiving part; and/or the pinion gear may be integrally formed with the first shaft part or positioned on the first shaft part in a separate configuration.

In yet another embodiment, the first shaft part and the second shaft part may have different diameters; the connection gear may comprise a protrusion part, preferably formed on an inner circumferential surface; the connection gear may comprise a first clutch spring insertion part and a second clutch spring insertion part, which may be arranged around the hole and receiving at least a part of the clutch spring; the connection gear may comprise at least one contact part, preferably protruding in parallel with the protrusion part and/or contacting an outer surface of the clutch spring; the connection gear may be provided with at least one opening part, preferably formed between the at least one contact part alternately; the connection gear may be arranged adjacent to the pinion gear, wherein preferably the connection gear may be adapted to surround at least a part of the body part; the clutch spring may comprise a first end and a second end; the clutch spring may have a ring shape with opened region, wherein preferably the first end and the second end may protrude in a direction opposite to the central direction of the clutch spring; an inner surface the clutch spring may surround the outer surface of the second shaft part; and/or the first end and the second end of the clutch spring, which may provide the opened region, may be inserted in the first and second insertion part.

It is also proposed by embodiments of the present disclosure that the receiving part may comprise a first partition part, preferably formed adjacent to the first shaft part, a second partition part, preferably formed adjacent to the second shaft part, and/or a receiving region, preferably provided as a space between the first partition part and the second partition part; and/or the protrusion part of the connection gear may be inserted into the receiving region.

Furthermore, it is proposed with embodiments of the present disclosure that the first end and the second end may be bent and may preferably protrude outside a circumferential direction formed by the clutch spring; at least one contact part may have a different height compared to at least one other contact part; and/or the first insertion part and the second insertion part may be formed in at least one contact part.

In a further embodiment the receiving region may be adapted to transmit a force to the first end and the second end, preferably in a direction in which the connection gear may rotate to increase a frictional force between the second shaft part and the clutch spring.

Embodiments of the present disclosure, moreover, provide an actuator designed for a rear view device, wherein the actuator comprises at least one clutch gear outlined above.

In another embodiment according to the present disclosure the actuator may further comprise a lower case, a holder, and a driving mechanism, wherein the driving mechanism may comprise a driving motor, and a drive gear.

Furthermore, in embodiments, the lower case may have an accommodation space formed inside, preferably having a bowl shape; the pinion gear may be engaged with the drive gear; and/or the connection gear may receive power from the driving motor.

It is also proposed by embodiments of the present disclosure that the driving mechanism may be arranged in the accommodation space; the clutch gear may be adapted to rotate by receiving power preferably from the driving motor; the drive gear may be adapted to rotate by being engaged with at least a part of the clutch gear, and wherein preferably the drive gear may be adapted to rotationally move along a part of an inner space of the lower case; and/or the holder may be adapted to surround an outer surface of the lower case and the holder may be connected to the drive gear.

Embodiments of the present disclosure, moreover, provide a rear view device for a vehicle comprising at least one clutch gear outlined above and/or at least one actuator outlined above.

In another embodiment the rear view device is provided in form of an external mirror, that may comprise a housing, preferably accommodating the at least one actuator, and a rear view element, preferably comprising at least one mirror, display unit and/or camera device, wherein preferably the rear view element may be connected with the holder.

In another embodiment, the body of the clutch gear may comprise a first shaft part, a second shaft part, a receiving part for partitioning the first and second shaft parts, a pinion gear, and a clutch spring.

According to various embodiments of the present disclosure, the clutch gear may have a part of a clutch spring fixed thereto, thereby enhancing durability and providing excellent transmission efficiency. The clutch spring may also be any kind of spring.

According to various embodiments of the present disclosure, an actuator for a rear view device or an external mirror is provided, wherein the actuator comprises a lower case having an accommodation space formed inside and having a bowl shape; and a driving mechanism arranged in the accommodation space; wherein the driving mechanism comprises, a driving motor, a clutch gear adapted to rotate by receiving power from the driving motor, and a drive gear adapted to rotate by being engaged with at least a part of the clutch gear, and rotationally move along a part of an inner space of the lower case, a holder adapted to surround an outer surface of the lower case and connected to the drive gear; wherein the clutch gear comprises, a connection gear having a hole in a center thereof and receiving power for the driving motor, a body inserted in the hole, and wherein the body comprises a first shaft part formed in a first direction, a second shaft part formed in a second direction opposite to the first direction, a receiving part for partitioning the first and second shaft parts and for engaging with at least a part of the connection gear, and a pinion gear arranged at the first shaft part and engaged with the drive gear, a clutch spring having an inner surface contacting the second shaft portion and an outer surface contacting the connection gear, wherein the connection gear comprises a first insertion part and a second insertion part which are arranged around the hole and receiving at least a part of the clutch spring, wherein the clutch spring has a ring shape with opened region, wherein a first end and a second end of the clutch spring which provide the opened region, are inserted in the first and second insertion part, respectively.

According to the various embodiments of the present disclosure, a clutch gear designed for use in an actuator for a rear view device is provided, wherein the clutch gear comprises a connection gear having a hole in a center thereof and receiving power for the outside; a body inserted in the hole, and wherein the body comprises a first shaft part formed in a first direction, to a second shaft part formed in a second direction opposite to the first direction, a receiving part for partitioning the first and second shaft parts and for engaging with at least a part of the connection gear, and a pinion gear arranged at the first shaft part and engaged with external gear; a clutch spring having an inner surface contacting the second shaft portion and an outer surface contacting the connection gear; wherein the connection gear comprises a first insertion part and a second insertion part which are arranged around the hole and receiving at least a part of the clutch spring, wherein the clutch spring has a ring shape with opened region, wherein a first end and a second end of the clutch spring which provide the opened region, are inserted in the first and second insertion part, respectively.

According to various embodiments of the present disclosure, an external mirror for a vehicle is provided, wherein the external mirror comprises: a housing; an actuator accommodating in the housing; and wherein the actuator comprises, a lower case having an accommodation space formed inside and having a bowl shape; a driving mechanism arranged in the accommodation space, and wherein the driving mechanism comprises, a driving motor, a clutch gear adapted to rotate by receiving power from the driving motor, and a drive gear adapted to rotate by being engaged with at least a part of the clutch gear, and rotationally move along a part of an inner space of the lower case, a holder adapted to surround an outer surface of the lower case and connected to the drive gear, a rear view element connected with the holder; wherein the clutch gear comprises, a connection gear having a hole in a center thereof and receiving power for the driving motor, a body inserted in the hole, and wherein the body comprises a first shaft part formed in a first direction, a second shaft part formed in a second direction opposite to the first direction, an receiving part for partitioning the first and second shaft parts and for engaging with at least a part of the connection gear, and a pinion gear arranged at the first shaft part and engaged with the drive gear, a clutch spring having an inner surface contacting the second shaft portion and an outer surface contacting the connection gear, wherein the connection gear comprises a first insertion part and a second insertion part which are arranged around the hole and receiving at least a part of the clutch spring, wherein the clutch spring has a ring shape with opened region, wherein a first end and a second end of the clutch spring which provide the opened region, are inserted in the first and second insertion part, respectively.

According to various embodiments of the present disclosure, an actuator is provided, comprising: a lower case having an accommodation space therein and a bowl shape; a driving mechanism arranged in the accommodation space, having a driving motor; a clutch gear adapted to receive power from the driving motor to rotate; and a drive gear adapted to rotate by being engaged with at least a part of the clutch gear, and rotationally move along an inner space of the lower case; a holder adapted to surround an outer surface of the lower case and connected to the drive gear; wherein the clutch gear comprises: a connection gear having a hole in a center thereof and receiving power for the driving motor; a body inserted in the hole and comprising a first shaft part formed in a first direction, a second shaft part formed in a second direction opposite to the first direction, an receiving part for partitioning the first and second shaft parts and for engaging with at least a part of the connection gear, and a pinion gear arranged at the first shaft part and engaged with the drive gear; and a clutch spring having an inner surface contacting the second shaft portion and an outer surface contacting the connection gear; wherein the connection gear comprises a first insertion part and a second insertion part which are arranged around the hole and accommodating at least a part of the clutch spring, and wherein the clutch spring has an opened partial region, and wherein first and second ends which provides the opened region, are inserted in the first and second insertion part, respectively.

According to an embodiment of the present disclosure, an actuator may be provided in which the first shaft part and the second shaft part have different diameters.

According to an embodiment of the present disclosure, the reception part may comprise a first partition part formed adjacent to the first shaft part, a second partition part formed adjacent to the second shaft part, and a reception region provided as a space between the first partition part and the second partition part, and the main gear may comprise a contact part formed on an inner circumferential surface thereof and inserted into the reception region.

According to an embodiment of the present disclosure, the first end and the second end may be provided with an actuator bent and protruding outward in a circumferential direction formed by the clutch spring.

According to an embodiment of the present disclosure, the main gear may comprise a plurality of contact parts formed to protrude in parallel with the protrusion part and to be in contact with an outer surface of the clutch spring, and the first insertion part and the second insertion part may be provided with an actuator formed in at least one of the plurality of contact parts.

According to an embodiment of the present disclosure, the main gear may be provided with an actuator in which the plurality of contact parts and an opening part formed between the plurality of contact parts are alternately formed when viewed in an axial direction of the main gear.

In accordance with an embodiment of the present disclosure, the reception region may be provided with an actuator adapted to transmit a force to the first end and the second end in a direction in which the main gear rotates, to increase a frictional force between the second shaft part and the spring clutch.

According to an embodiment of the present disclosure, there is provided an actuator comprising: the driving mechanism having: a second driving motor; a second clutch gear adapted to receive power from the second driving motor to rotate; a second drive gear arranged to be vertical to the drive gear and adapted to rotationally move along an inner surface of the lower case; the clutch gear comprises a second connection gear having a second hole at the center, and receiving power for the driving motor; a second body inserted into the hole having a third shaft part formed in a third direction, a fourth shaft part formed in a fourth direction opposite to the third direction, and second accommodation for partitioning the third and fourth shaft parts and engaging at least a part of the second connection gear, wherein the second connection gear is formed in around the second hole and comprises a third insertion part and a fourth insertion part for accommodating at least a part of the second clutch spring, and wherein the second clutch spring has a ring shape with an opened partial region, and wherein a third end and fourth end providing the opened region are inserted into the third insertion part and fourth insertion part, respectively.

According to various embodiments of the present disclosure, the clutch gear may comprise a connection gear having a hole in a center thereof and may be adapted to receive power from the driving motor; and a body part insertedly arranged in the hole, the body part may comprise a first shaft part formed in a first direction, a second shaft part formed in a second direction opposite to the first direction, a receiving part adapted to partition the first shaft part and the second shaft part and to be coupled to at least a part of the connection gear, and a pinion gear (e.g., the clutch spring may comprise a first spring reception part and a second insertion part), wherein a part of the clutch spring may have an open ring shape, and a first end and a second end providing the open region may be provided with a clutch gear inserted into the first insertion part and the second insertion part, respectively.

According to various embodiments of the present disclosure, an external mirror is provided comprising: a housing; an actuator accommodating in the housing, having: a lower case having an accommodation space therein and a bowl shape; a driving mechanism arranged in the accommodation space, having a driving motor; a clutch gear adapted to receive power from the driving motor to rotate; and a drive gear adapted to rotate by being engaged with at least a part of the clutch gear, and rotationally move along an inner space of the lower case; a holder adapted to surround an outer surface of the lower case and connected to the drive gear; a rear view element connected with the holder; wherein the clutch gear comprises: a connection gear having a hole in a center thereof and receiving power for the driving motor; a body inserted in the hole and comprising a first shaft part formed in a first direction, a second shaft part formed in a second direction opposite to the first direction, an receiving part for partitioning the first and second shaft parts and for engaging with at least a part of the connection gear, and a pinion gear arranged at the first shaft part and engaged with the drive gear; and a clutch spring having an inner surface contacting the second shaft portion and an outer surface contacting the connection gear; wherein the connection gear comprises a first insertion part and a second insertion part which are arranged around the hole and accommodating at least a part of the clutch spring, and wherein the clutch spring has an opened partial region, and wherein first and second ends which provides the opened region, are inserted in the first and second insertion part, respectively.

In an embodiment the actuator of a rear view device may comprise a lower case having an accommodation space formed inside and having a bowl shape; and a driving mechanism arranged in the accommodation space; a holder adapted to surround an outer surface of the lower case and connected to the driving gear.

In a further embodiment, when viewed in an axial direction of the transmission gear, the transmission gear may be provided with a plurality of contact parts and a plurality of opening parts formed between the plurality of contact parts alternately.

In another embodiment, it is further proposed that a clutch gear provided in an actuator of a rear view device may comprise a transmission gear having a hole in a center thereof and receiving power for the outside; a body inserted in the hole, and a clutch spring having an inner surface contacting the second shaft part and an outer surface contacting the transmission gear.

In another embodiment, it is further proposed that a rear view device for a vehicle may comprise a housing; an actuator accommodating in the housing; and a rear view member connected with the holder.

According to various embodiments, the clutch gear may have a part of a clutch spring fixed thereto, thereby enhancing durability and providing excellent transmission efficiency.

Embodiments of the present disclosure also provide a vehicle with at least one rear view device as described above.

Other aspects, advantages, and salient features of the present disclosure will become apparent to those skilled in the art from the following detailed description, which taken in conjunction with the annexed drawings, discloses exemplary embodiments of the disclosure, wherein:

DETAILED DESCRIPTION

Figure 1:
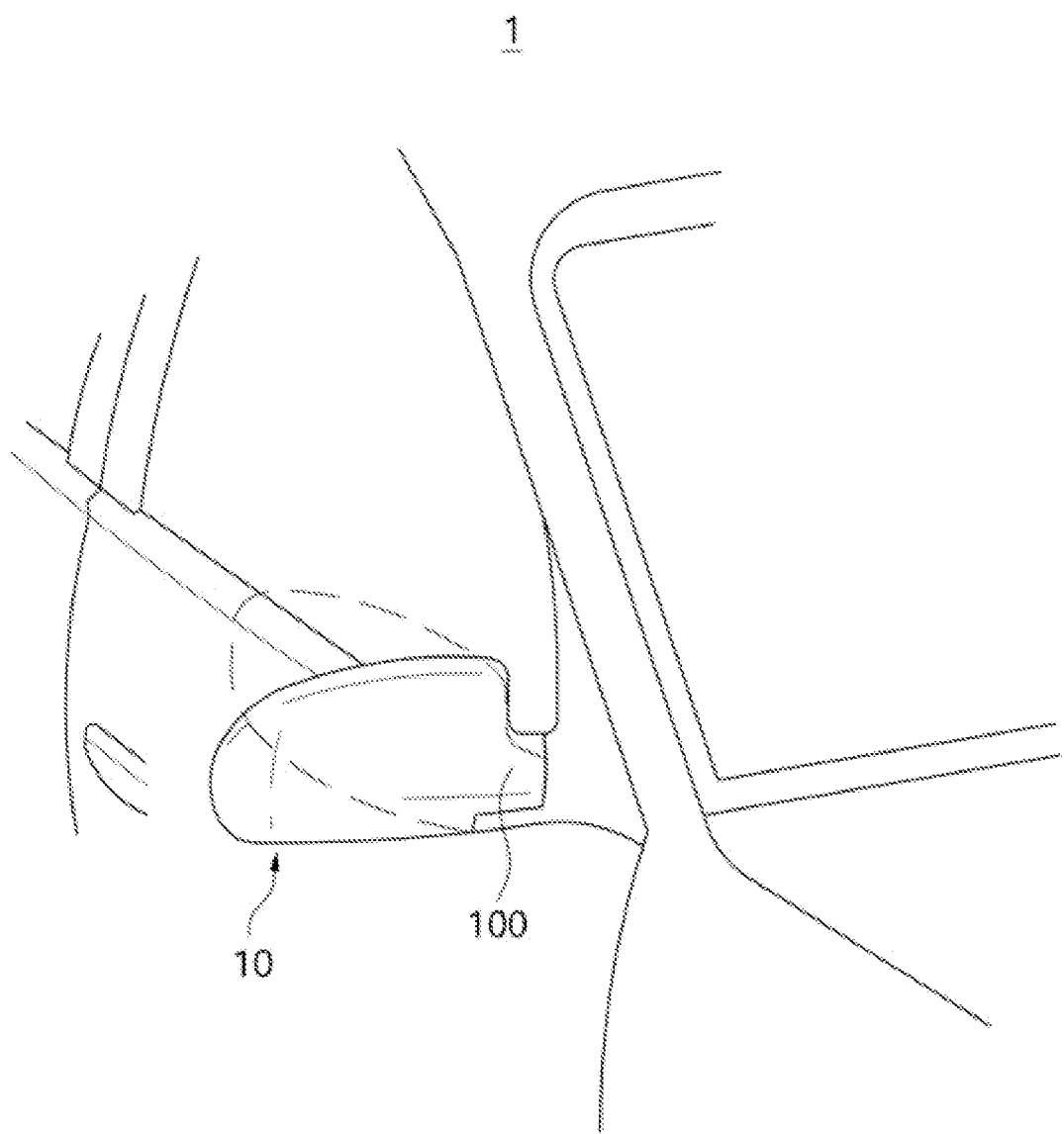
FIG. 1 is an embodiment of an external mirror according to the present disclosure in which an actuator according to the present disclosure is mounted according to an embodiment.

The foregoing objects, features and advantages of the present disclosure will become more apparent from the following detailed description related to accompanying drawings. However, various modifications may be applied to the present disclosure, and the present disclosure may have various embodiments. Hereinafter, specific embodiments, which are illustrated in the drawings, will be described in detail.

In the drawings, the thicknesses of layers and regions may be exaggerated for clarity. When it is indicated that an element or layer is "on" or "above" another element or layer, this comprises a case in which another layer or element is interposed therebetween as well as a case in which the element or layer is directly above the other element or layer. In principle, like reference numerals designate like elements throughout the specification. In the following description, like reference numerals are used to designate elements which have the same function within the same idea illustrated in the drawings of each embodiment.

When detailed description of known functions or configurations related to the present disclosure is deemed to unnecessarily blur the gist of the disclosure, the detailed description thereof will be omitted. Also, numerals (e.g., first, second, etc.) used in the description herein are merely identifiers for distinguishing one element from another element.

In addition, the terms "module" and "unit" used to refer to elements in the following description are given or used in combination only in consideration of ease of writing the specification, and the terms themselves do not have distinct meanings or roles.

Furthermore, the use of a singular term, such as, "a" is not to be interpreted as limiting the number of components or details of particular components. Additionally, various terms and/or phrases describing or indicating a position or directional reference such as, but not limited to, "top", "bottom", "front", "rear", "forward", "rearward", "end", "outer", "inner", "left", "right", "vertical", "horizontal", etc. may relate to one or more particular components as seen generally from a user's vantage point during use or operation, and such terms and/or phrases are not to be interpreted as limiting, but merely as a representative basis for describing the disclosure to one skilled in the art. In addition, a suffix "region", "part", "unit" for a component used in the following description are given or mixed in consideration of only the ease of writing the specification, and do not have meanings or roles distinguished from each other.

The present disclosure relates to a clutch gear, an actuator in particular for pivoting a rear view device and/or rear view element for a vehicle and an external mirror comprising such a clutch gear.

Hereinafter, an actuator according to an embodiment of the present disclosure will be described in general.

Figure 2:
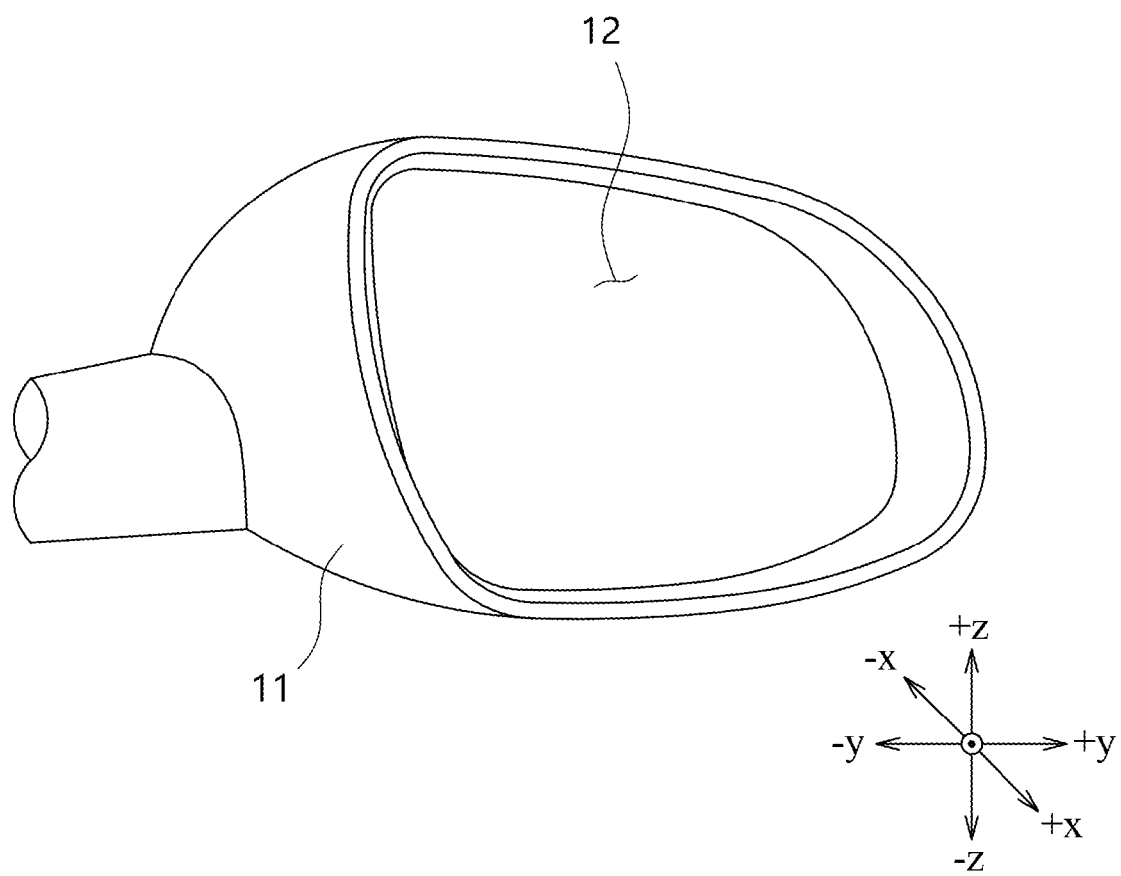
FIG. 2 illustrates an actuator according to an embodiment of the present disclosure.

FIG. 1 is an embodiment of a rear view device in form of an external mirror according to the present disclosure in which an actuator of the present disclosure is mounted according to an embodiment of the present disclosure. FIG. 2 illustrates an actuator according to an embodiment of the present disclosure.

The following description will be made with reference to FIGS. 1 and 2.

The actuator 100 according to an embodiment of the present disclosure may be mounted on rear view device 10 arranged outside the vehicle 1. Here, the rear view device is an external mirror 10 that may comprise a rear view element 12 providing a rear view to the driver. Further, the external mirror 10 may comprise housing 11 accommodating the rear view element 12. For example, the rear view element 12 may be at least one mirror element. Alternatively, the rear view element 12 may be implemented as a display that outputs an image obtained by photographing a peripheral region of the vehicle 1 or a camera device or a combination of all these. However, for the convenience of description, embodiments in which the rear view element 12 is implemented as a mirror element will be mainly described below.

In the present disclosure, an external mirror 10 for a vehicle 1 will be described for convenience of description. However, the external mirror 10 in the present disclosure is not limited to vehicles 1, but may be applied to various transportation apparatus such as a two-wheel moving apparatus (for example, a motor bike).

According to various embodiments of the present disclosure, the actuator 100 may be mounted in the external mirror 10 for a vehicle to perform an operation for pivoting the external mirror 10 and/or rear view element 12 for a vehicle. For example, the actuator 100 may be accommodated in the housing 11 of the external mirror 10 to provide power to pivot the rear view element 12 mounted on the external mirror 10.

The actuator 100 may operate to pivot the rear view element 12 in all directions with respect to a surface on which the rear view element 12 is arranged. For example, when the rear view element 12 is inclined parallel to the Z-Y axis in the initial state, the actuator 100 may rotate the rear view element 12 with respect to all of the y-axis, the x-axis, and the z-axis.

In the following description of the present disclosure, unless specifically mentioned, the −x-axis direction may refer to the traveling direction of the vehicle 1. For example, the x-axis direction may refer to the rear of the vehicle 1. In addition, the Y-axis direction may refer to a lateral direction of the vehicle 1. For example, the +y-axis direction may refer to a right direction of the vehicle 1, and the −y-axis direction may refer to a left direction of the vehicle 1. In addition, the Z-axis direction may refer to an upper or lower direction of the vehicle 1. For example, the −z-axis direction may refer to a lower direction of the vehicle 1, and the +z-axis direction may refer to an upper direction of the vehicle 1.

Figure 3:
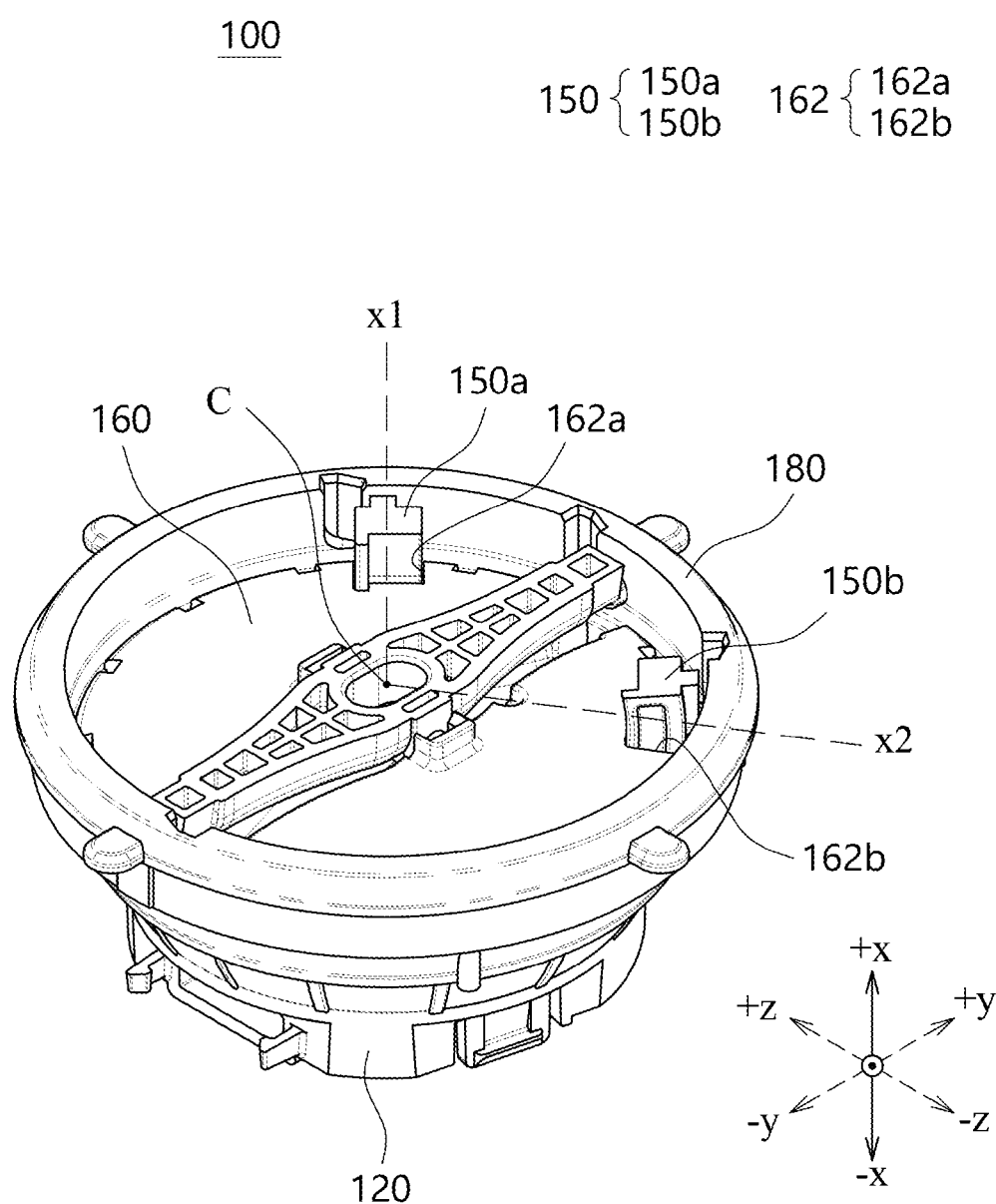
FIG. 3 is a perspective view of an actuator according to various embodiments of the present disclosure.
Figure 4:
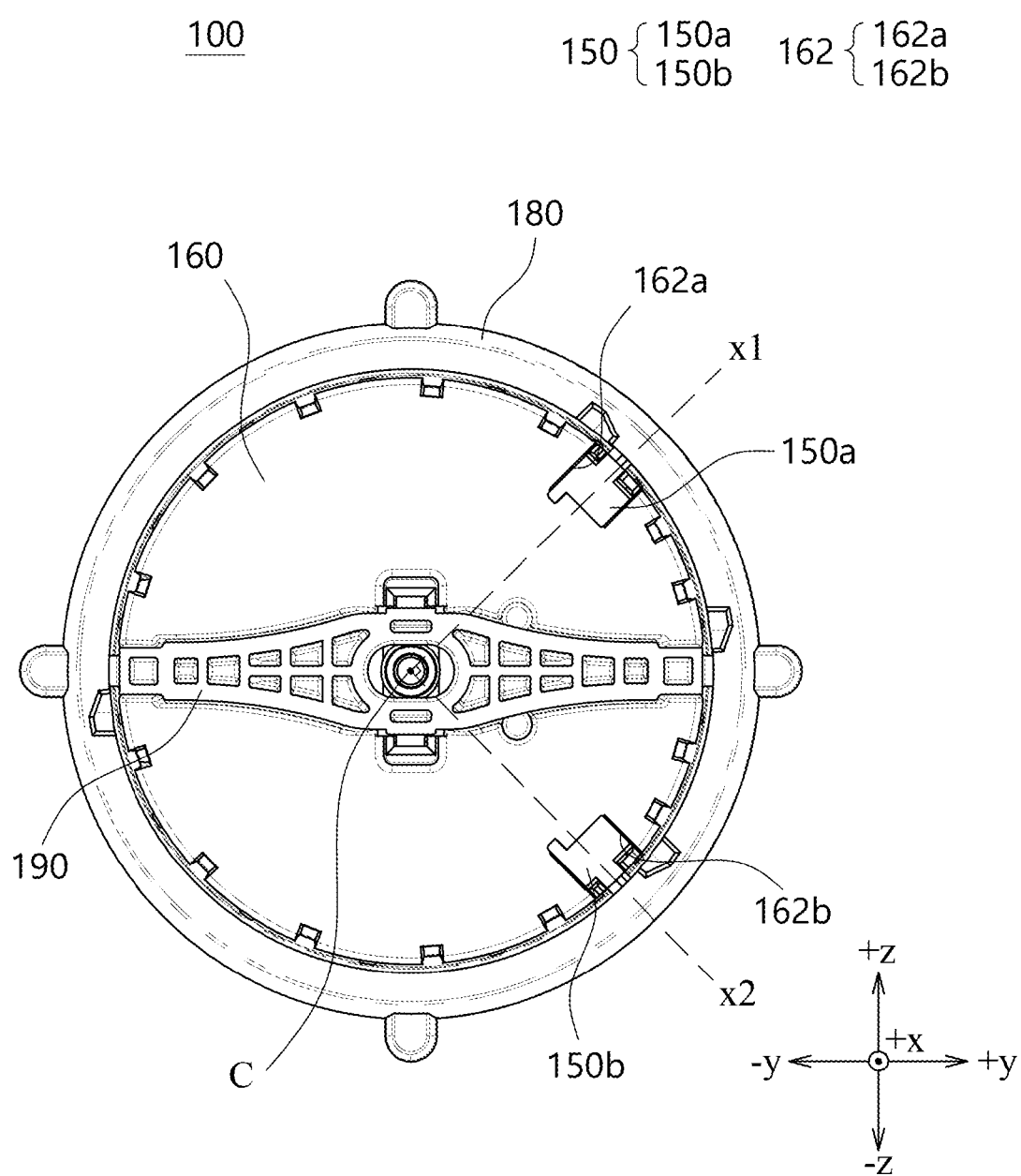
FIG. 4 is a top view of an actuator according to various embodiments of the present disclosure.
Figure 5:
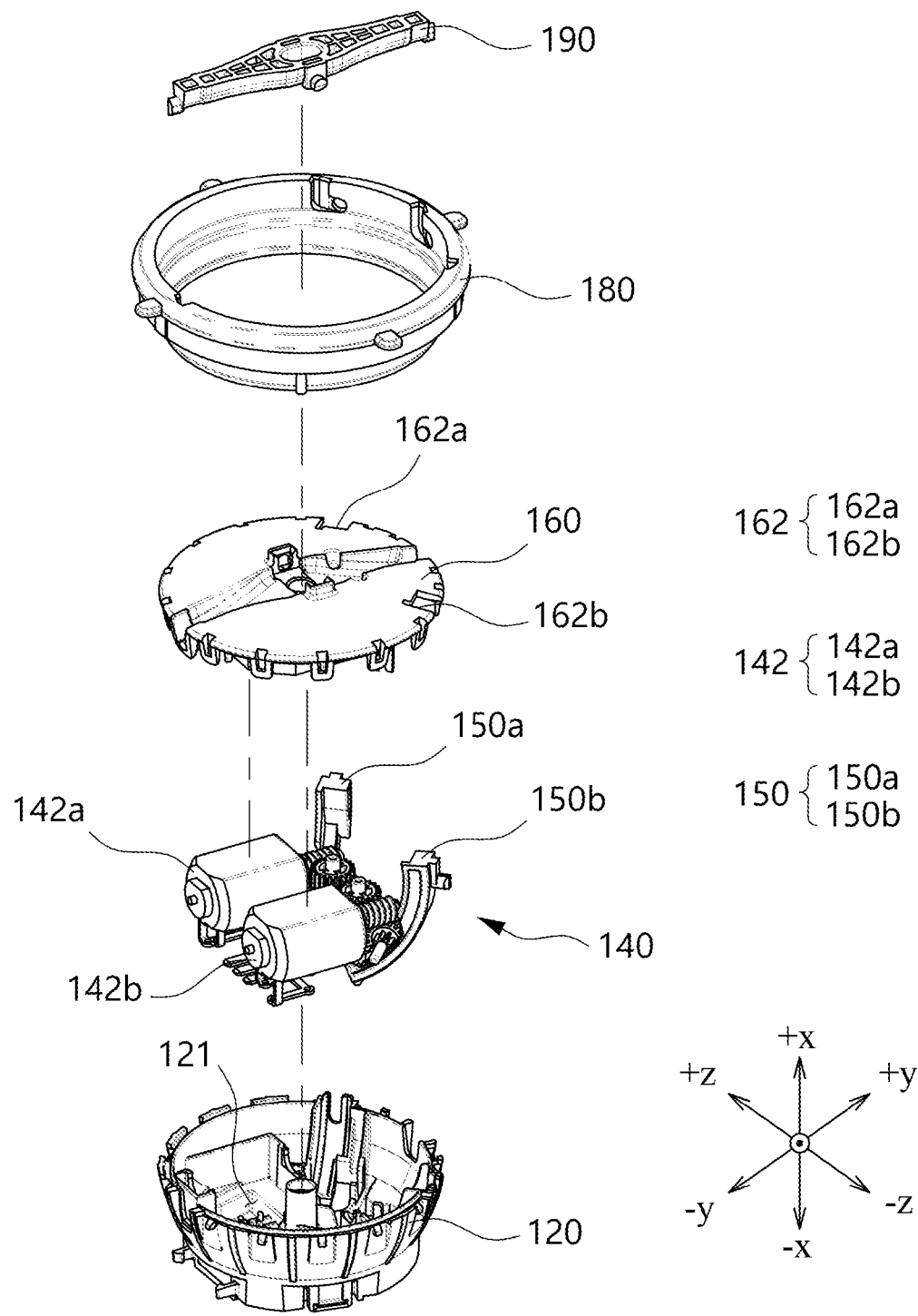
FIG. 5 is an exploded perspective view of an actuator according to various embodiments of the present disclosure.

FIG. 3 to FIG. 5 are views of an actuator 100 according to various embodiments of the present disclosure at various angles. FIG. 3 is a perspective view of an actuator 100 according to various embodiments of the present disclosure. FIG. 4 is a top view of an actuator 100 according to various embodiments of the present disclosure. FIG. 5 is an exploded perspective view of an actuator 100 according to various embodiments of the present disclosure.

Referring to FIGS. 3 to 5, the actuator 100 may comprise all or some of the lower case 120, the driving mechanism 140 accommodated in the lower case 120, the upper cover 160 shielding at least a part of the lower case 120, the holder 180 adapted to surround at least partially the lower case 120, and the connection element 190 connected to the holder 180 and adapted to operate by receiving power from the driving mechanism 140. The actuator 100 of the embodiments of FIG. 3 to FIG. 5 may have a configuration that is the same as or similar to the actuator 100 of the embodiments of FIG. 1 and FIG. 2.

According to various embodiments of the present disclosure, the lower case 120 may provide a space in which the driving mechanism 140 may be accommodated. For example, the lower case 120 may have a bowl shape in which an accommodation space 121 is formed, and the driving mechanism 140 may be arranged in the accommodation space 121. In an embodiment of the present disclosure, the lower case 120 may be formed such that a width of an upper side (+x-axis direction) is greater than a width of a lower side (−x-axis direction).

According to various embodiments of the present disclosure, the driving mechanism 140 may comprise a driving motor 142 and a drive gear 150. In an embodiment of the present disclosure, the driving motor 142 may comprise first and second driving motors 142a and 142b. However, it will be understood that the illustrated embodiments are exemplary, and fewer or more driving motors may be comprised. In an embodiment of the present disclosure, the driving motor 142 may be supplied with power from an external power source (e.g., an internal power source of the vehicle 1 of FIG. 1) to operate.

In one embodiment of the present disclosure, the driving mechanism 140 may comprise a drive gear 150 that operates to pivot the rear view element 12 (e.g., the rear view element 12 of FIG. 2). For example, the drive gear 150 may comprise a first drive gear 150a and a second drive gear 150b. The first drive gear 150a may operate by receiving power of the first driving motor 142a, and the second drive gear 150b may operate by receiving power of the second driving motor 142b. The first drive gear 150a and the second drive gear 150b are symmetrical to each other, and unless specifically mentioned, the description of the first drive gear 150a may be applied to the second drive gear 150b. Hereinafter, for convenience of description, the operation of the first drive gear 150a will be mainly described.

According to various embodiments of the present disclosure, the upper cover 160 may be arranged on the upper part of the lower case 120 and may shield the accommodation space 121. In an embodiment of the present disclosure, the upper cover 160 may comprise an opening region 162 for providing a moving path of the drive gear 150. For example, the opening region 162 may comprise a first opening region 162a through which the first drive gear 150a passes and a second opening region 162b through which the second drive gear 150b passes.

According to various embodiments of the present disclosure, the holder 180 may be adapted to surround at least partially the outer surface of the lower case 120. In an embodiment of the present disclosure, the holder 180 may have a ring shape. In an embodiment of the present disclosure, when the holder 180 is viewed from the side surface (e.g., the y-axis direction or the z-axis direction), the width of the lower side (−x-axis direction) may be formed to be smaller than the width of the upper side (+x-axis direction). For example, when viewed from a side surface (e.g., a y-axis direction or a z-axis direction), the holder 180 and the lower case 120 may have shapes corresponding to each other. In an embodiment of the present disclosure, a width (or diameter) of a portion (e.g., an upper portion (+x-axis direction)) of the holder 180 in the horizontal direction (y-axis or z-axis) may be greater than a width of the widest horizontal direction (y-axis or z-axis) of the lower case 120. In addition, a width of another portion (e.g., a lower portion (−x-axis direction)) of the holder 180 in the horizontal direction (y-axis or z-axis) may be smaller than a width of at least a portion of the upper portion (+x-axis direction) of the lower case 120. Accordingly, after the holder 180 and the lower case 120 are assembled, the lower case 120 may be prevented from being separated in the lower vertical direction (−x axis direction) of the holder 180.

In an embodiment of the present disclosure, the holder 180 may be operably connected to the drive gear 150. For example, the holder 180 may be connected to each of the first drive gear 150a and the second drive gear 150b, and may be pivoted with respect to the horizontal plane (e.g., the y-z plane, for example, the surface of the rear view element 12) in correspondence to the operation of the first drive gear 150a and the second drive gear 150b. As the first drive gear 150a and the second drive gear 150b are arranged at right angles to each other, the holder 180 may be pivoted in all directions with respect to the horizontal plane (y-z plane). In an embodiment of the present disclosure, the holder 180 may be connected to the rear view element 12 (e.g., the rear view element of FIG. 2), and the rear view element may be pivoted corresponding to the operation of the holder 180.

In an embodiment of the present disclosure, the connection element 190 may be operably connected between the upper cover 160 and the holder 180. For example, a central portion of the connection element 190 may be rotatably connected to a central region of the upper cover 160, and both edges of the connection element 190 may be connected to the holder 180. As a portion of the connection element 190 (for example, a central region connected to the upper cover 160) is supported by the upper cover 160, the holder 180 may be stably pivoted.

In an embodiment of the present disclosure, the first drive gear 150a and the second drive gear 150b may be adapted to form a designated angle with respect to a horizontal surface (e.g., a z-y plane) of an upper region of the holder 180. Since the rear view element 12 (e.g., the rear view element 12 of FIG. 2) is arranged above the holder 180, the z-y plane may refer to a surface parallel to the surface of the rear view element 12. For example, the designated angle may be approximately a right angle. As another example according to an embodiment of the present disclosure, an angle formed by the axis x1 extending from the center point c of the width direction plane (z-y plane) of the actuator 100 to one end of the first drive gear 150a and the axis x2 extending from the center point c to one end of the first drive gear 150a of the second drive gear 150b may be represented as a right angle. As will be described later, the first drive gear 150a may rotate about a direction parallel to the x2 axis, and the second drive gear 150b may rotate about a direction parallel to the x1 axis. For example, the x1 axis may be the same axis as the y axis, and the x2 axis may be the same axis as the z axis. As another example according to an embodiment of the present disclosure, the x1 axis may be the same axis as the z axis, and the x2 axis may be the same axis as the y axis.

Figure 6:
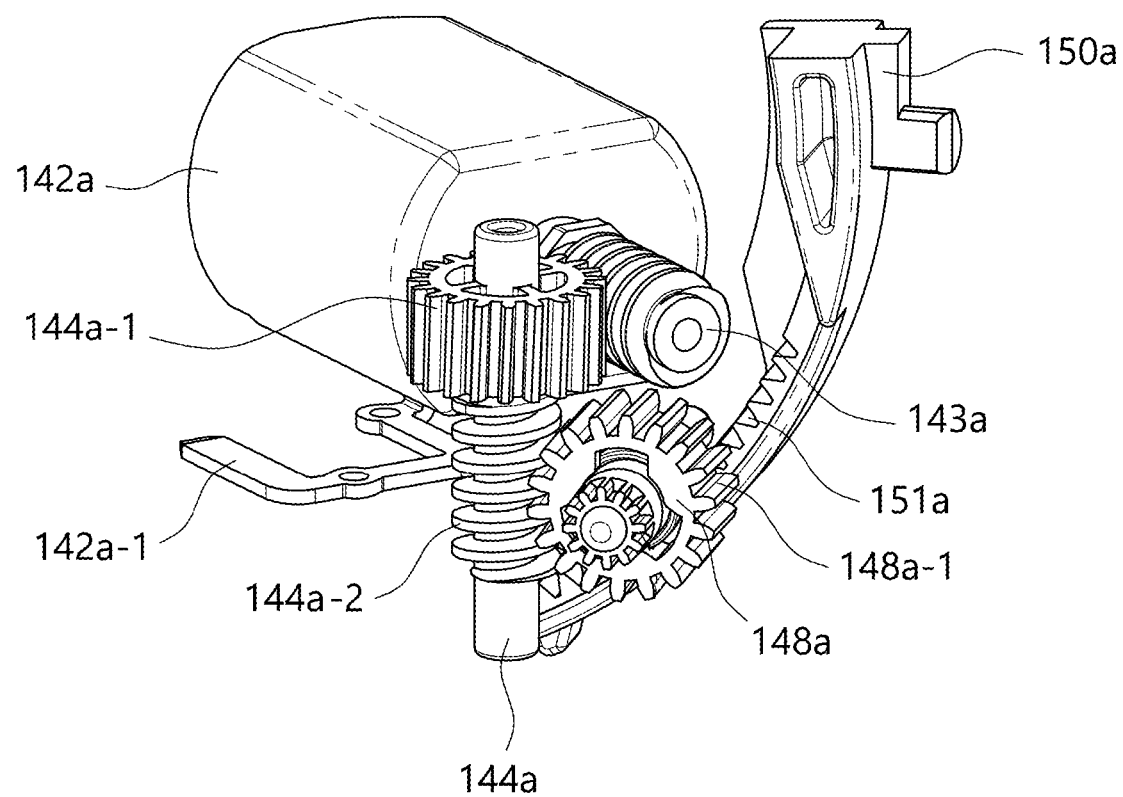
FIG. 6 is a view illustrating a driving mechanism according to various embodiments of the present disclosure on a first side.
Figure 7:
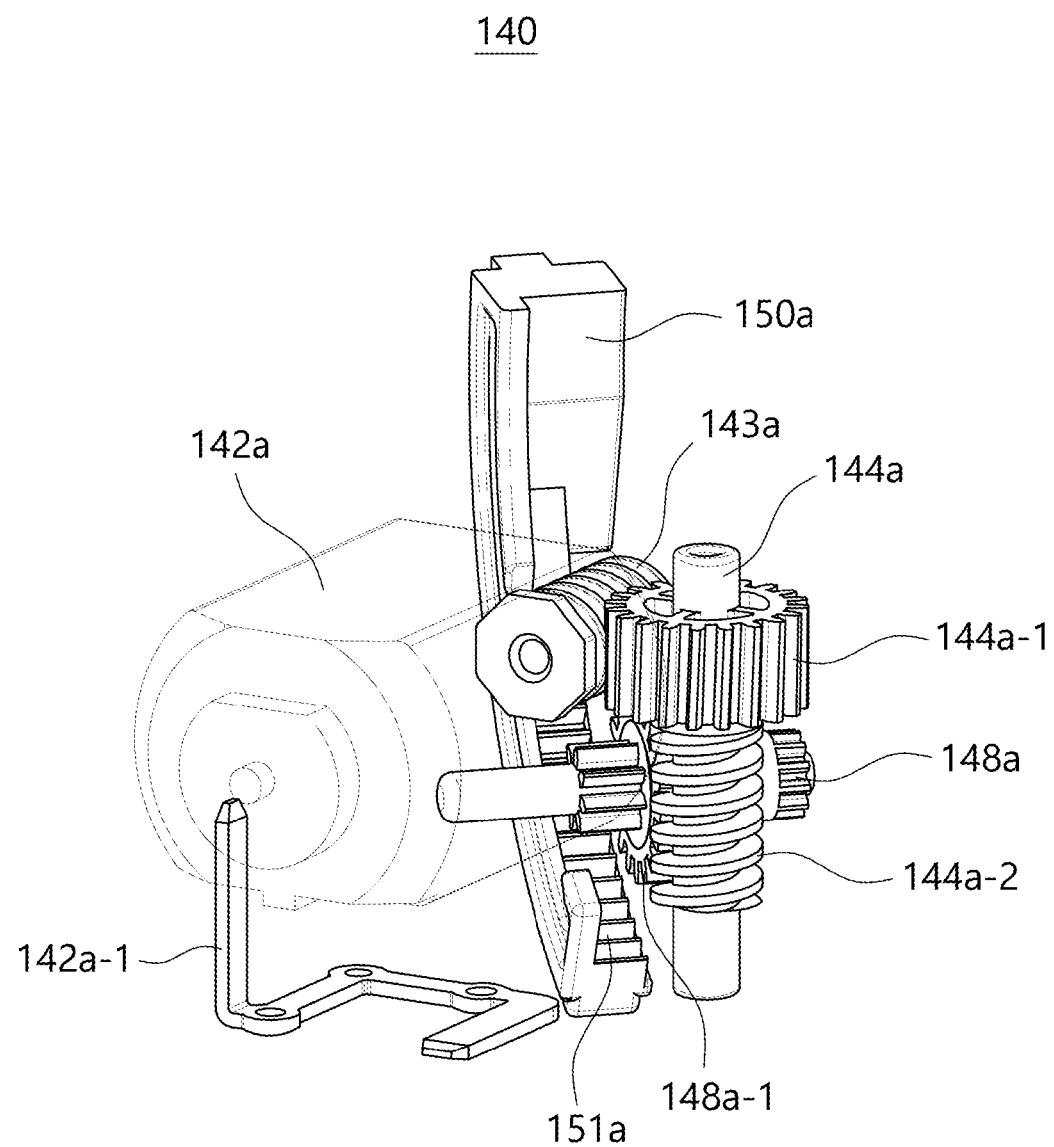
FIG. 7 is a view illustrating a driving mechanism according to various embodiments of the present disclosure on a second side.
Figure 8:
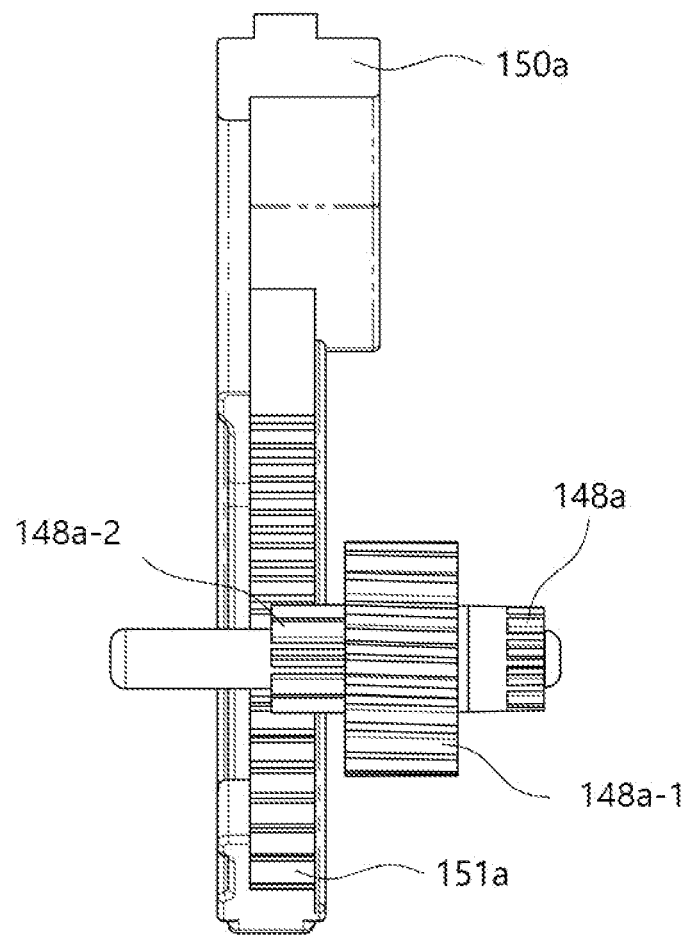
FIG. 8 is a view illustrating a drive gear and a clutch gear according to various embodiments of the present disclosure.

FIG. 6 to FIG. 8 illustrate an embodiment of a driving mechanism according to various embodiments of the present disclosure. FIG. 6 is a view illustrating a driving mechanism 140 according to various embodiments of the present disclosure on a first side. FIG. 7 is a view illustrating a driving mechanism 140 according to various embodiments of the present disclosure on a second side; FIG. 8 is a view illustrating a drive gear 150 and a clutch gear 148 according to various embodiments of the present disclosure.

Referring to the embodiments of FIGS. 6 to 8, the driving mechanism 140 may comprise at least some of a first driving motor 142a, a first transmission gear 144a, a first clutch gear 148a, and a first drive gear 150a. Stated differently, the driving mechanism 140 may be said to comprise a first driving mechanism 140a (a driving mechanism associated with the first driving motor 142a) and a second driving mechanism 140b (e.g., a driving mechanism associated with the second driving motor 142b). The description of the driving mechanism 140 (e.g., the driving mechanism 140 of FIG. 5) in the above-described embodiments of the present disclosure may be applied to the driving mechanism 140 of FIGS. 6 to 8.

According to various embodiments of the present disclosure, the first driving motor 142a may comprise a first terminal 142a-1 and a first output gear 143a. The first terminal 142a-1 may be electrically connected to the outside of the first driving motor 142a (e.g., internal power of the vehicle 1) to receive power for operating the first driving motor 142a. In an embodiment of the present disclosure, the first terminal 142a-1 may be connected to another terminal or a circuit board arranged in the lower case 120 (e.g., the lower case 120 of FIG. 5), or may be connected to another terminal outside the lower case 120. The first output gear 143a may transmit the power of the first driving motor 142a to other components.

According to various embodiments of the present disclosure, the first transmission gear 144a may be connected to the first output gear 143a. In addition, the first transmission gear 144a may be connected to the first clutch gear 148a. In other words, the first transmission gear 144a may connect the first output gear 143a and the first clutch gear 148a. In an embodiment of the present disclosure, the first transmission gear 144a may comprise a first transmission part 144a-1 for connecting with the first output gear 143a and a second transmission part 144a-2 for connecting with the first clutch gear 148a. In an embodiment of the present disclosure, the first transmission part 144a-1 and the second transmission part 144a-2 may transmit power in different directions, or may transmit power in the same direction. For example, the first transmission part 144a-1 may be provided as a spur gear or a helical gear, and the second transmission part 144a-2 may be provided as a worm gear.

According to various embodiments of the present disclosure, the first clutch gear 148a may comprise a first part 148a-1 for receiving power from the first transmission gear 144a and a second part 148a-2 for engaging with at least a portion of the first drive gear 150a. In one embodiment of the present disclosure, the first part 148a-1 may be provided as a spur gear or a helical gear to engage the second part 148a-2. In addition, the second part 148a-2 may be provided as a pinion gear to engage the first drive gear 150a. In an embodiment of the present disclosure, the first part 148a-1 and the second part 148a-2 may share the same axis but have different diameters. For example, the second part 148a-2 provided as a pinion gear may have a diameter smaller than that of the first part 148a-1.

According to various embodiments of the present disclosure, the first drive gear 150a may comprise a first driving region 151a to be engaged with the second part 148a-2. In an embodiment of the present disclosure, the first driving region 151a may be provided as a rack gear. In addition, the first drive gear 150a may have a smoothly curved shape. For example, the first drive gear 150a may be arc-shaped. Since the first drive gear 150a has an arc shape, the first drive gear 150a may smoothly perform a revolve motion based on the central axis of the arc (e.g., the x2 axis of FIG. 4) in correspondence with the operation of the second part 148a-2. In addition, the first drive gear 150a may move along an inner surface of the lower case 120, as described below. To this end, the shape of the outer surface of the first drive gear 150a and the shape of the inner surface of the lower case 120 may correspond to each other. For example, the curvature of the outer surface of the first drive gear 150a may be substantially the same as the curvature of the inner surface of the lower case 120.

In the above description and the following description of the present disclosure, the first drive gear 150a and various components for driving the first drive gear 150a (e.g., the first driving motor 142a, the first transmission gear 144a, and the first clutch gear 148a) will be mainly described. As described above, the description of this can be equally (or symmetrically) applied to the second drive gear 150b and the components for driving the second drive gear 150b. That is, it will be understood that the driving mechanism 140 may comprise all or some of a second drive gear 150b (e.g., the second drive gear 150b of FIG. 4) and components for driving the same (e.g., the second driving motor 142b, the second transmission gear 144b, and the second clutch gear 148b), similar to the first drive gear 150a.

In various embodiments, since the first drive gear 150a moves in comparison to other components constituting the driving mechanism 140 engaged with each other to rotate, it is necessary to stably support the first drive gear 150a or limit the range of movement of the first drive gear 150a during operation of the first driving gear 150a.

Figure 9:
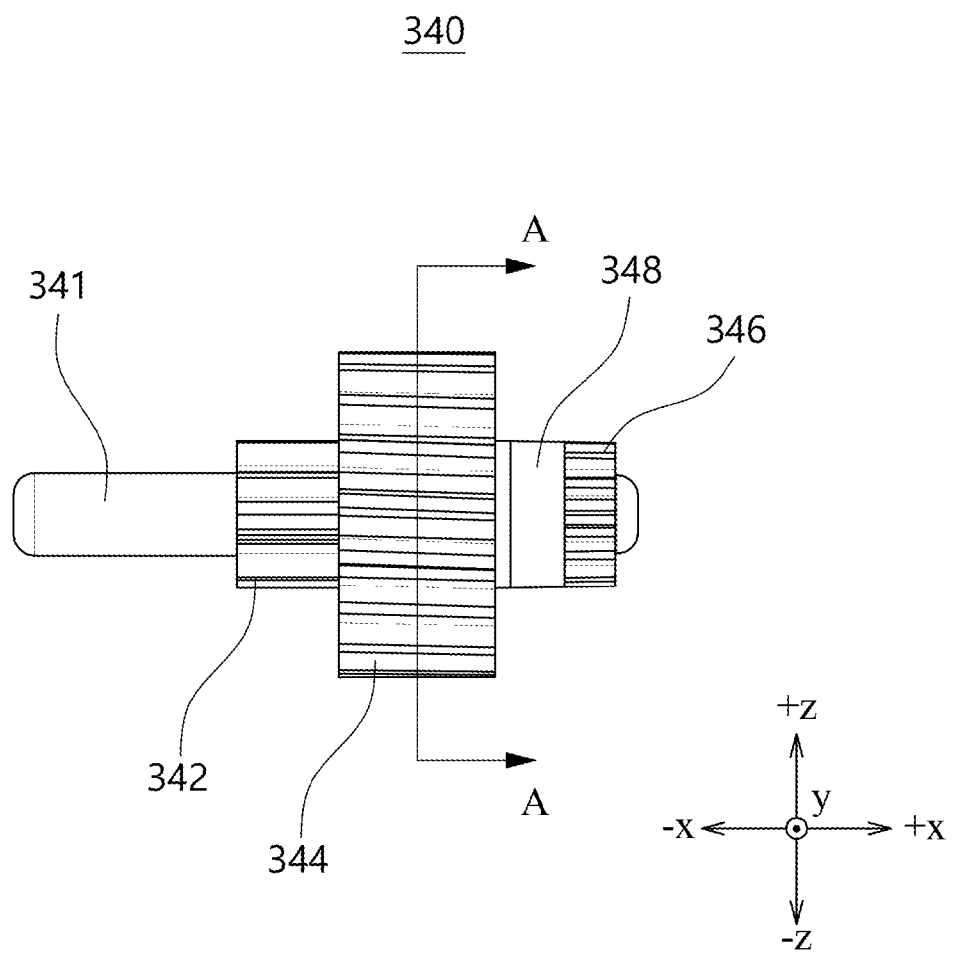
FIG. 9 is a front view of a clutch gear according to various embodiments of the present disclosure.
Figure 10:
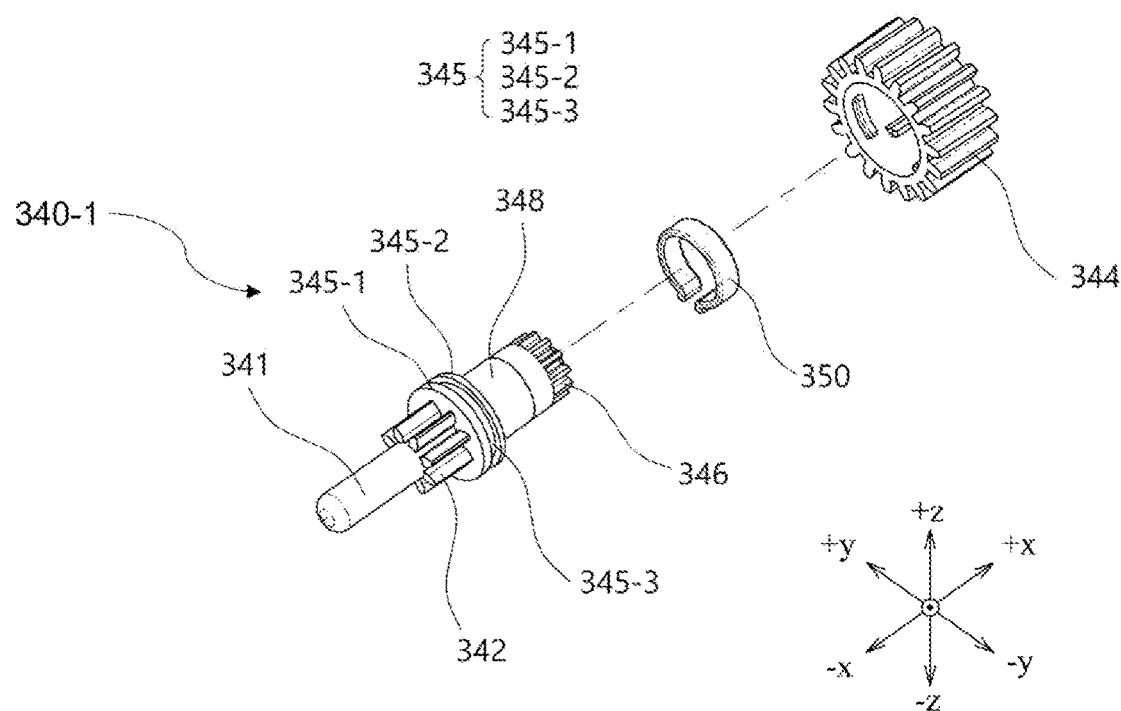
FIG. 10 is an exploded view of a clutch gear according to various embodiments of the present disclosure.
Figure 11:
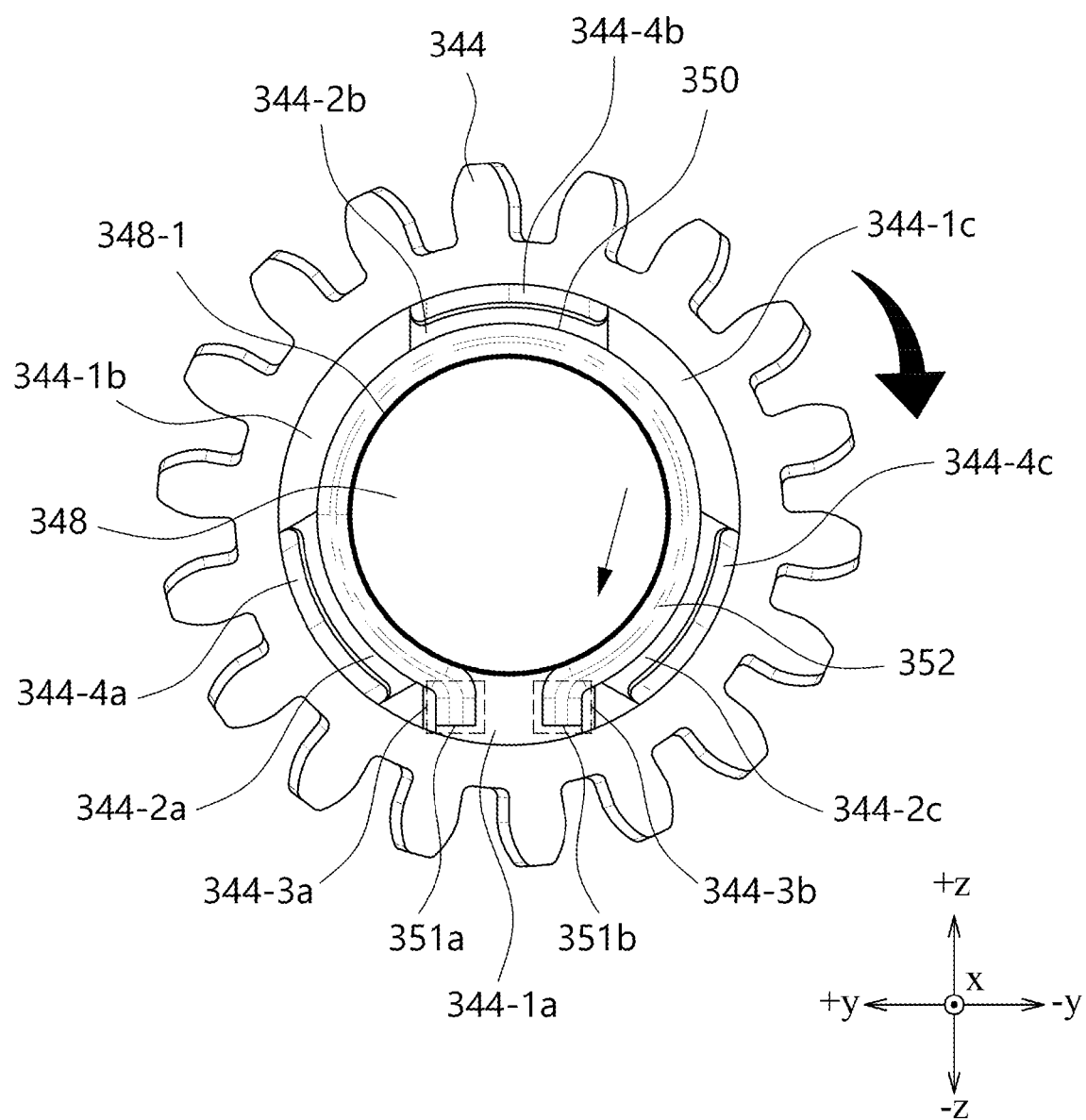
FIG. 11 is a cross-sectional view taken along line A-A' of FIG. 9.

FIG. 9 to FIG. 11 are views illustrating an embodiment of clutch gear used in an actuator according to various embodiments of the present disclosure. FIG. 9 is a front view of a clutch gear according to various embodiments of the present disclosure. FIG. 10 is an exploded view of a clutch gear according to various embodiments of the present disclosure.

Referring to FIGS. 9 to 10, the clutch gear 340 may comprise a first shaft part 341, a second shaft part 348, a pinion gear 342, a connection gear 344, and a clutch spring 350. The clutch gear 340 of FIGS. 9 to 10 may have the same configuration as the clutch gear 148a or 148b of FIGS. 6 to 8. In the following description, the pinion gear 342 may correspond to the second part 148a-2 described above with reference to FIGS. 6 to 8. In addition, the connection gear 344 may correspond to the first part 148a-1 described above with reference to FIGS. 6 to 8.

According to various embodiments, the body part 340-1 may form an entire central axis of the clutch gear 340, and may be provided as a support on which other components (e.g., the connection gear 344 or the clutch spring 350) may be arranged. In an embodiment of the present disclosure, a first shaft part 341 may be formed at one side (e.g., the −x-axis direction) of the body part 340-1, and a second shaft part 348 may be formed at the other side (e.g., the +x-axis direction) thereof. An auxiliary region 346 may be formed at an end of the second shaft part 348. The auxiliary region 346 is not essential. However, in some embodiments of the present disclosure, the actuator 100 may further comprise a memory module (not shown), and the auxiliary region 346 may be connected to the memory module.

A receiving part 345 may be formed in a central region of the body part 340-1. The receiving part 345 may comprise a first partition part 345-1 formed in one direction and a second partition part 345-2 formed in the other direction. A receiving region 345-3 may be formed between the first partition part 345-1 and the second partition part 345-2. In other words, a space (e.g., the receiving region 345-3) formed between the first partition part 345-1 and the second partition part 345-2 may be provided as a region in which the connection gear 344 is arranged.

A pinion gear 342 may be arranged in at least a part of the first shaft part 341 adjacent to the receiving part 345. The pinion gear 342 may be integrally formed with the first shaft part 341 or may be positioned on the first shaft part 341 in a separate configuration. As described above, the pinion gear 342 may be engaged with the driving region (e.g., the first driving region 150a) of the drive gear 150.

The connection gear 344 may be arranged adjacent to the pinion gear 342 and may be adapted to surround at least a part of the body part 340-1. In an embodiment of the present disclosure, the connection gear 344 may comprise (a) protrusion part(s) at an inner side thereof, and the protrusion part(s) may be arranged in the receiving region 345-3. As the protrusion part(s) are arranged in the receiving region 345-3, the connection gear 344 may be prevented from being separated in the axial direction (x-axis direction) of the body part 340-1 by the first and second partition parts 345-1 and 345-2.

A clutch spring 350 may be arranged in the second shaft part 348. The clutch spring 350 may be adapted to surround at least a part of the second shaft part 348. For example, the clutch spring 350 may be arranged such that an inner surface thereof contacts an outer surface of the second shaft part 348 and an outer surface thereof contacts an inner surface of the connection gear 344. The clutch spring 350 may be provided as a clutch spring due to a difference in friction force between the clutch spring 350 and the second shaft part 348 and friction force between the spring and the connection gear 344.

FIG. 11 is a cross-sectional view taken along line A-A' of FIG. 9.

Referring to FIG. 11, the connection gear 344 may comprise a contact part 344-1, an opening part 344-2, and a clutch spring insertion part 344-3 formed on an inner surface thereof. In addition, the clutch spring 350 may comprise a first end 351a and a second end 351b. The connection gear 344, the second shaft part 348, and the clutch spring 350 of FIG. 11 may be the same as those of the connection gear 344, the second shaft part 348, and the clutch spring 350 of FIGS. 9 and 10, and thus, repeated descriptions thereof will be omitted.

According to various embodiments, the contact part 344-1 may comprise first to third contact parts 344-1a, 344-1b, and 344-1c. The contact part 344-1 may be formed in parallel with protrusion parts (not shown) to be arranged in the receiving region 345-2. Each of the first to third contact parts 344-1a, 344-1b, and 344-1c may contact an outer surface of the clutch spring 350. According to various embodiments of the present disclosure, the opening part 344-2 may comprise first to third opening parts 344-2a, 344-2b, and 344-2c formed alternately with the contact part 344-1. For example, respective opening parts (e.g., the first to third opening parts 344-2a, 344-2b, and 344-2c) may be formed between the respective contact parts (e.g., the first to third contact parts 344-1a, 344-1b, and 344-1c). In the illustrated embodiment of the present disclosure, the opening parts and the protrusion parts are formed in three, but those skilled in the art will be able to change the design as needed. As another example, the fourth to sixth contact parts 344-4a, 344-4b, and 344-4c may be alternately arranged with the first to third contact parts 344-1a, 344-1b, and 344-1c. The heights of the fourth to sixth contact parts 344-4a, 344-4b, and 344-4c may be lower than the heights of the first to third contact parts 344-1a, 344-1b, and 344-1c, and the first to third opening parts 344-2a, 344-2b, and 344-2c may be formed between the fourth to sixth contact parts 344-4a, 344-4b, and 344-4c and the inner surface of the connection gear 344.

According to various embodiments of the present disclosure, the clutch spring 350 may be adapted such that an inner surface thereof surrounds the outer surface 348-1 of the second shaft part 348. For example, the clutch spring 350 may be in contact with an outer surface 348-1 of the second shaft part 348. In an embodiment of the present disclosure, the clutch spring 350 may have a curved shape in which a partial region is opened, not a closed curve. For example, the clutch spring 350 may have a circular ring shape corresponding to the shape of the second shaft part 348 to surround the second shaft part 348, and may have a shape in which the first end 351a and the second end 351b are spaced apart from each other. The first end 351a and the second end 351b may refer to ends extending in different directions from the body part 352 of the clutch spring 350. In an embodiment of the present disclosure, the first end 351a and the second end 351b may protrude in a direction opposite to the central direction of the clutch spring 350. For example, the first end 351a and the second end 351b may extend from the body part 352 and may be bent to face the connection gear 344.

According to various embodiments, the connection gear 344 may comprise a clutch spring insertion part 344-3 for receiving the first end 351a and the second end 351b. The insertion reception part 344-3 may comprise a first spring insertion part 344-3a for receiving the first end 351a and a second spring insertion part 344-3b for receiving the second end 351b. In an embodiment of the present disclosure, the spring insertion part 344-3 may be formed in the contact part 344-1. For example, as in the illustrated embodiment, the spring insertion part 344-3 may be formed in the first contact part 344-1a. The spring insertion part 344-3 may have a concave (groove) shape and may correspond to the shapes of the first end 351a and the second end 351b. The spring insertion part 344-3 may transmit a force to the clutch spring 350 to correspond to a direction in which the pinion gear 342 rotates, thereby increasing a frictional force between the outer surface 348-1 of the second shaft part 348 and the inner surface of the clutch spring 350. However, the first end 351a and the second end 351b may be insertedly coupled to the spring insertion part 344-3.

As described above, although the embodiments are described by the limited embodiments and the drawings, various modifications and changes may be made by those skilled in the art from the above description. For example, appropriate results may be achieved even if the described techniques are performed in a different order than the described method, and/or components of the described system, structure, apparatus, circuit, etc. are combined or combined in a different form than the described method, or replaced or substituted by other components or equivalents.

Therefore, other implementations, other embodiments, and those equivalent to the claims also fall within the claims to be described below.

REFERENCE SIGNS 1 vehicle
10 external mirror
11 housing
12 rear view element
100 actuator
120 lower case
121 accommodation space
122 outer surface
140 driving mechanism
142 driving motor
142a, 142b first, second driving motor
142a1 first terminal
143 output gear
143a, 143b first, second output gear
144 transmission gear
144a, 144b first, second transmission gear
144a-1, 144a-2 first, second transmission part
148 clutch gear
148a, 148b first, second clutch gear
148a-1, 148a-2 first, second part
148a-3 auxiliary gear
150 drive gear
150a, 150b first, second drive gear
151a, 151b first, second driving region
160 upper cover
162 opening region
162a, 162b first, second opening region
180 holder
190 connection element
340 clutch gear
340-1 body part
341 first shaft part
342 pinion gear
344 connection gear
344-1 contact part
344-1 a, b, c first, second, third contact part
344-2 opening part
344-2 a, b, c first, second, third opening part
344-3 clutch spring insertion part
344-3 a, b first, second spring insertion part
344-4 a, b, c fourth, fifth, sixth contact part
345 receiving part
345-1, 345-2 first, second partition part
345-3 receiving region
346 auxiliary region
348 second shaft part
348-1 outer surface
350 clutch spring
351a, 351b first, second end

The invention claimed is:
1. A clutch gear for use in an actuator of a rear view device for a vehicle, comprising:
a connection gear that defines a hole in its center and that is configured to receive power; and
a body part inserted in the hole, wherein the body part comprises
a first shaft part,
a second shaft part,
a receiving part between the first and second shaft parts,
a pinion gear, and a clutch spring, wherein the clutch spring has an inner surface contacting the second shaft part and an outer surface contacting the connection gear, wherein the clutch spring comprises a first end and a second end, wherein the clutch spring has a ring shape with an opened region, and wherein the first end and the second end protrude in a direction opposite to a central direction of the clutch spring, and wherein the first end and the second end of the clutch spring provide the opened region, and are inserted in first and second clutch spring insertion parts.

2. The clutch gear of claim 1, wherein the first shaft part is formed in a first direction.

3. The clutch gear of claim 2, wherein the second shaft part is formed in a second direction, wherein the second direction is opposite to the first direction.

4. The clutch gear of claim 1, wherein an auxiliary region is formed at an end of the second shaft part connected to a memory module.

5. The clutch gear of claim 1, wherein the receiving part is configured for partitioning the first and second shaft parts for engaging with at least a part of the connection gear.

6. The clutch gear of claim 1, wherein the body part forms a central axis of the clutch gear.

7. The clutch gear of claim 1, wherein the pinion gear is arranged in at least a part of the first shaft part, wherein the pinion gear is engaged with an external gear.

8. The clutch gear of claim 1, wherein the pinion gear is adjacent to the receiving part.

9. The clutch gear of claim 1, wherein the pinion gear is integrally formed with the first shaft part or positioned on the first shaft part in a separate configuration.

10. The clutch gear of claim 1, wherein the first shaft part and the second shaft part have different diameters.

11. The clutch gear of claim 1, wherein the connection gear comprises a protrusion part formed on an inner circumferential surface.

12. The clutch gear of claim 1, wherein the connection gear comprises the first clutch spring insertion part and the second clutch spring insertion part, which are arranged around the hole and that receive at least a part of the clutch spring.

13. The clutch gear of claim 12, wherein the first clutch spring insertion part and the second clutch spring insertion part are formed in respective contact parts.

14. The clutch gear of claim 1, wherein the connection gear comprises at least one contact part protruding in parallel with a protrusion part and/or contacting the outer surface of the clutch spring.

15. The clutch gear of claim 14, wherein the connection gear is provided with an opening part formed between two contact parts.

16. The clutch gear of claim 14, wherein one contact part has a different height compared to one other contact part.

17. The clutch gear of claim 1, wherein the connection gear is arranged adjacent to the pinion gear, and wherein the connection gear is adapted to surround at least a part of the body part.

18. The clutch gear of claim 1, wherein the inner surface of the clutch spring surrounds an outer surface of the second shaft part.

19. The clutch gear of claim 1, wherein the receiving part comprises:

a first partition part formed adjacent to the first shaft part, a second partition part formed adjacent to the second shaft part, and a receiving region provided as a space between the first partition part and the second partition part.

20. The clutch gear of claim 19, wherein a protrusion part of the connection gear is inserted into the receiving region.

21. The clutch gear of claim 19, wherein the clutch spring comprises the first end and the second end, and wherein the receiving region is configured to transmit a force to the first end and the second end in a direction in which the connection gear rotates to increase a frictional force between the second shaft part and the clutch spring.

22. The clutch gear of claim 1, wherein the first end and the second end are bent and protrude outside a circumferential direction formed by the clutch spring.

23. An actuator for a rear view device, comprising at least one clutch gear according to claim 1.

24. The actuator of claim 23, further comprising:

a lower case;

a holder; and a driving mechanism, wherein the driving mechanism comprises a driving motor and a drive gear.

25. The actuator of claim 24, wherein the lower case has an accommodation space formed inside having a bowl shape.

26. The actuator of claim 24, wherein the pinion gear is engaged with the drive gear.

27. The actuator of claim 24, wherein the connection gear receives power from the driving motor.

28. The actuator of claim 24, wherein the driving mechanism is disposed in an the-accommodation space.

29. The actuator of claim 24, wherein the at least one clutch gear is configured to rotate by receiving power from the driving motor.

30. The actuator of claim 24, wherein the drive gear is configured to rotate by being engaged with at least a part of the clutch gear, and to rotationally move along a part of an inner space of the lower case.

31. The actuator of claim 24, wherein the holder is configured to surround an outer surface of the lower case and connected to the drive gear.

32. A rear view device for a vehicle comprising at least one of a clutch gear according to claim 14 or an actuator according to claim 23.

33. The rear view device of claim 32, wherein the rear view device is provided in form of an external mirror.

34. The rear view device of claim 33, wherein the external mirror comprises a housing accommodating the actuator; and a rear view element comprising at least one mirror, display unit and/or camera device, wherein the rear view element is connected with a holder.

35. A vehicle with at least one rear view device of claim 32.

* * * * *